Dec. 3, 1957  G. R. HEIMERICH  2,815,451
PHOTOGRAPHIC FILM CHANGERS
Filed Oct. 27, 1954  3 Sheets-Sheet 2

INVENTOR.
George R. Heimerich
BY
ATTORNEY

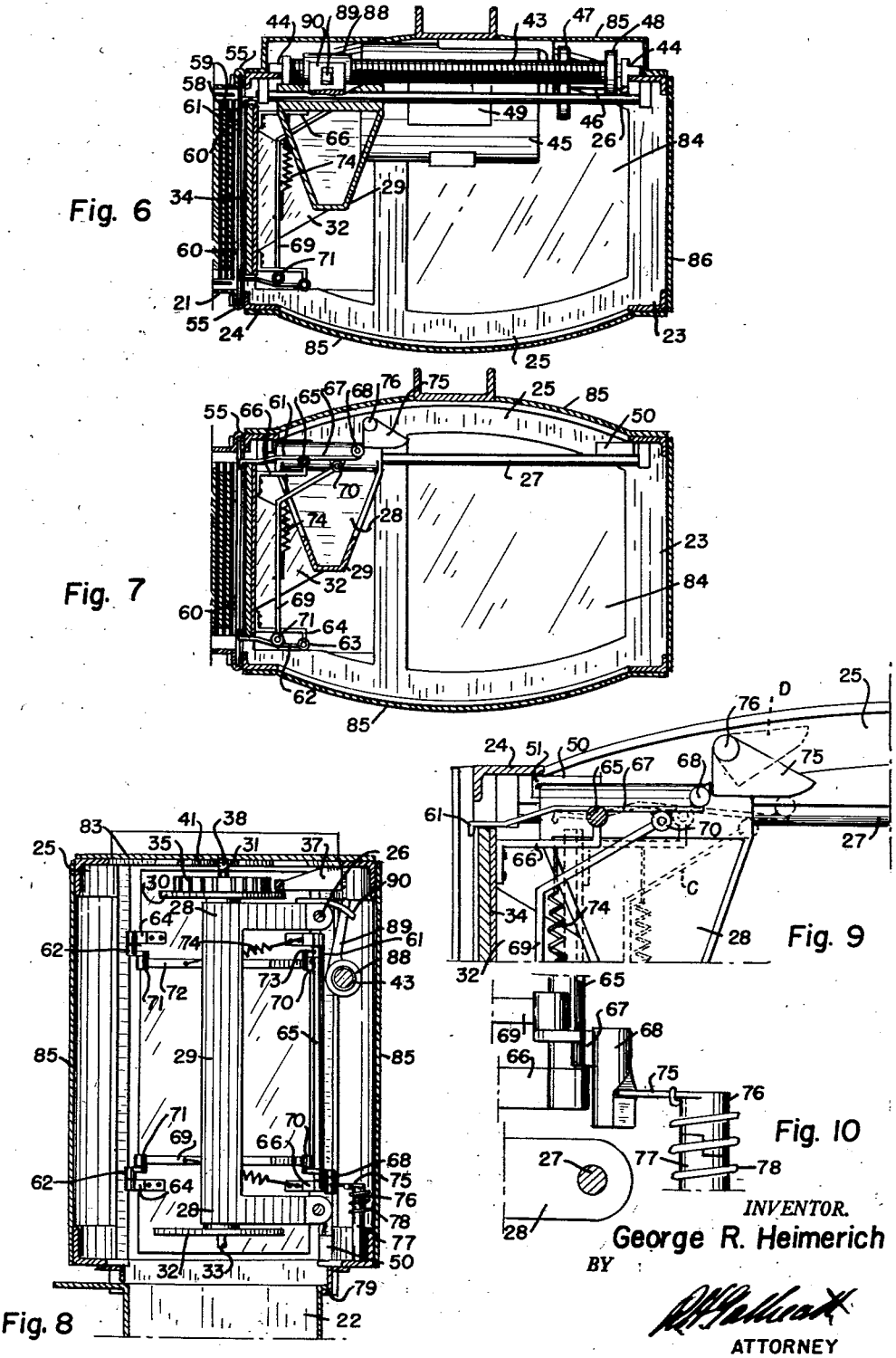

United States Patent Office 2,815,451
Patented Dec. 3, 1957

2,815,451

PHOTOGRAPHIC FILM CHANGERS

George Ralph Heimerich, Denver, Colo.

Application October 27, 1954, Serial No. 465,043

8 Claims. (Cl. 250—66)

This invention relates to an automatic film changing device for photographic work, and is more particularly designed as an improvement over the industrial X-ray film holder shown in applicant's prior Patent No. 2,349,427. While the invention has been more particularly designed for placing unexposed X-ray film in an exposure position and for removing and storing exposed X-ray films, the construction would be equally useful wherever it is desired to provide an automatic cut film interchanging device in photographic equipment of any nature.

The principal object of the invention is to provide a highly efficient film interchange mechanism which can be placed on the inside of steel structures, such as boilers, towers and the like, for making a series of successive X-ray photographs of the seam welds and other internal structure of tubular containers and which can be operated from a remote control at the X-ray operator's position without requiring any attention at the film interchange position.

Another object of the invention is to provide a film interchange device which will, upon receiving an initial electrical impulse, automatically and repeatedly proceed through the various steps of removing and storing the exposed film and positioning the unexposed film without manual attention and without danger of light exposure.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 6 is a horizontal sectional view, taken on the line 6—6, of Fig. 4.

Fig. 7 is a similar horizontal section, taken on the line 7—7, Fig. 4.

Fig. 8 is a vertical cross-section, taken on the line 8—8, Fig. 4.

Fig. 9 is an enlargement of the upper left-hand portion of Fig. 7.

Fig. 10 is an enlargement of the structure shown in the lower right-hand portion of Fig. 9.

Figure 1:
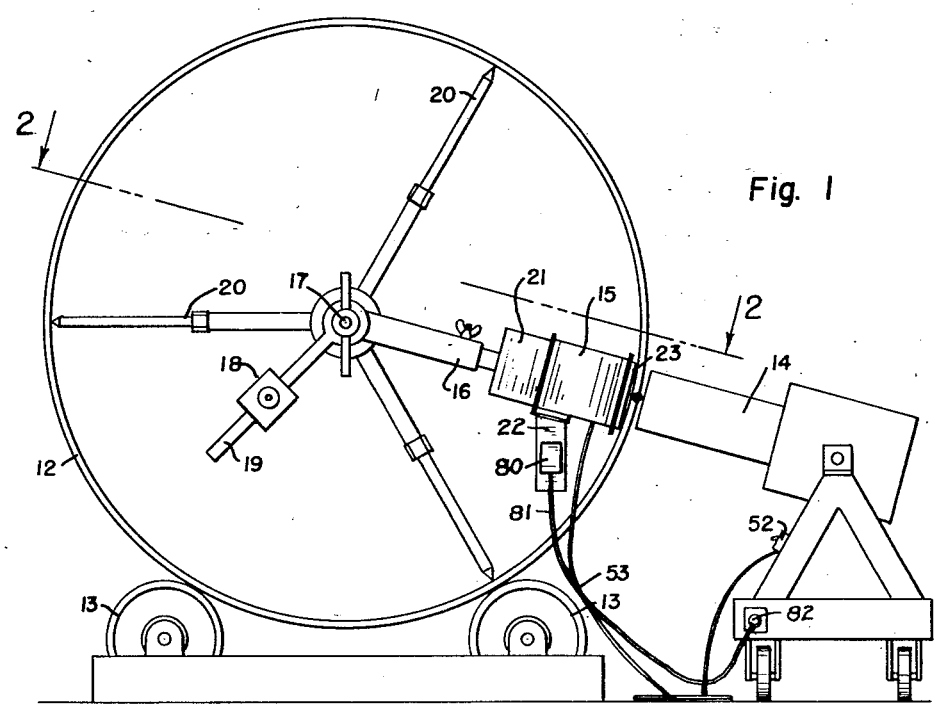
Fig. 1 illustrates the invention as it would appear in use for X-raying a circumferential seam in a cylindrical member.
Figure 2:
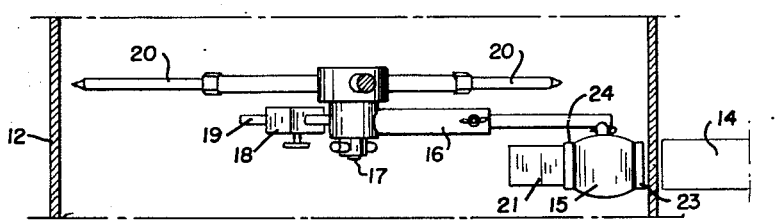
Fig. 2 is a cross-section through the cylindrical member of Fig. 1, taken on the line 2—2, of Fig. 1.
Figure 11:
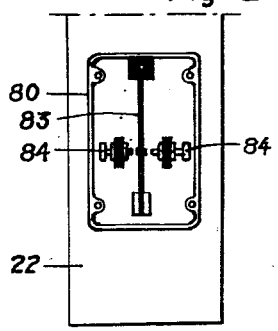

While the invention can be used wherever it is desired to provide an automatic interchange of unexposed and exposed photographic film, it has been illustrated and described herein for industrial X-ray work. In Fig. 1, the improved film interchange device is illustrated X-raying a cylindrical seam in a cylindrical container 12 supported upon rotatable rollers 13. An X-ray projector, such as designated by the numeral 14, is positioned on the exterior of the container 12, and the improved film interchange device, designated in its entirety by the numeral 15, is positioned within the container 12 directly in alignment with the X-rays being projected by the projector 14. An unexposed film container 21 is mounted on the rear of the exchange device, and an exposed film box 22 is mounted below the film exchange device.

For cylindrical container use, the interchange device 15 is supported on a telescoping arm 16 extending from an axis pivot member 17. The arm 16 is clamped by any suitable clamping means to a channel bracket bar 91 on the interchange device. The weight of the film interchange device and its arm 16 is counterbalanced about the axis of the pivot member 17 by means of a suitable counterweight 18 adjustably mounted on a counterweight arm 19 which forms an extension of the telescoping arm 16.

The axis pivot member is supported coaxially within the container 12 upon extensible tripod legs 20 which can be extended into clamping contact with the interior of the container 12 to maintain the axis pivot coaxial during the revolution of the container. The counterbalance 18 is adjusted to maintain the film interchange device 15 in exact alignment with the axis of the X-ray projector during rotation of the container 12.

The film interchange mechanism is completely enclosed in a light-proof housing consisting of a top plate 83, a bottom plate 84, side plates 85, and a front plate 86 of a material which is pervious to X-rays. The interchange mechanism and the housing plates are supported by a box-like framework consisting of a rectangular front frame 23 and a rectangular rear frame 24 maintained in parallel, spaced-apart relation by means of four arcuate side frame members 25.

A pair of vertically spaced, horizontal guide rods 26 and 27 extend between the front and rear frames 23 and 24 adjacent one side of the framework. A cross-head member 28 is slidably mounted on each of the guide rods 26 and 27. The two cross-head members 28 are connected by and act to support a carriage member 29 vertically in the medial plane of the framework.

A film plate bracket 30 is pivoted on a pivot stud 31 projecting upwardly from the upper cross-head member 28, and a similar film plate bracket 32 is pivoted on a similar pivot stud 33 projecting downwardly from the lower cross-head member 28. The film plate brackets are secured to the upper and lower portions of a film plate 34 of a size and shape which will substantially close the front and rear frames 23 and 24.

The film plate 34 is adapted to swing from a position in the rear frame 24 to a position in the front frame 23 and thence return to the rear frame 24. The swinging of the film plate from its extreme positions is accomplished by means of a toothed sector 35 which is secured to the upper bracket 30 concentrically of the axis of the stud 31, and which is positioned to mesh with the teeth of a toothed rack bar 36 supported from one of the side frame members 25 upon suitable rack bar supporting arms 37.

The toothed portion of the rack bar 36 is only sufficiently long to be engaged by the sector 35 during the intermediate portion of the travel of the carriage member 29. At the extremities of the travel, the sector 35 and its associated film plate 34 are prevented from rotating about the axis of the studs 31 and 33 by means of a stop lug 38 which projects upwardly from the upper bracket 30, and which, together with the upper stud 31, enters a rear receiving slot 39, as the film plate approaches its rearmost position, and enters a forward receiving slot 40 as the film plate approaches its foremost position. The slots 39 and 40 are formed in cam-shaped slot plates 41 and 42 supported from the rear frame 24 and the front frame 23, respectively.

It can be seen from the above structure that as the cross-head members 28 are forced toward the front frame 23, the sector 35 will engage the teeth of the rack bar 36 and rotate the film plate 180° to a position parallel with the plane of the front frame 23. The lug 38 will then enter the slot 40 to maintain the film plate in this position as the cross-head members complete their forward travel, as shown in broken line at "A" in Fig. 3. Conversely, as the cross-head members are forced toward the rear frame 24, the sector will engage the teeth of the rack bar and rotate the film plate rearwardly, as indicated in broken line at "B" in Fig. 3, until the lug 38 enters the rear slot 39 to guide the film plate rearwardly parallel to the plane of the rear frame 24.

The forward and back movement of the cross-head members 28 is accomplished by means of a threaded shaft 43 journalled between suitable bearings 44 upon the front and rear frames 23 and 24. A threaded nut 88 is mounted on the threaded shaft 43. The nut 88 is held from rotation by means of a projecting arm 89 which engages a receiving opening in an ear plate 90 fixedly mounted on the upper cross-head member 28 to transmit longitudinal movement to the latter. The threaded shaft is rotated in either desired direction by means of an electric motor 45 through suitable power transmission means. As illustrated, the motor 45 drives a countershaft 46 through the medium of a suitable belt drive 47 and the countershaft drives the threaded shaft 43 through the medium of a similar belt drive 48.

The motor is controlled by means of a solenoid-actuated reversing relay 49 and a starting relay 87 mounted upon the motor 45. The control circuit for the relays 49 and 87 includes two single-pole, double-throw, limit switches 50 which are mounted on one of the lower side frame members 25 in the path of a switch-activating pin 51 fixed in and extending downwardly from the lower cross-head member 28. A third remote control switch 52 is provided in the control circuit. The switch 52 can be located at any point convenient to the operator through the medium of an extension cord 53.

Figure 3:
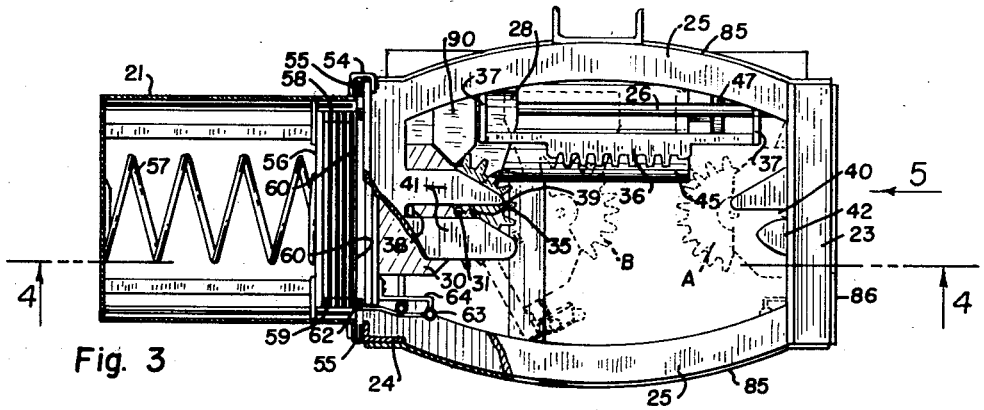
Fig. 3 is a top view of the improved film interchanging device, illustrating the latter with its upper enclosing plate removed and with its unexposed film reservoir broken away to illustrate the interior construction of the latter.
Figure 4:
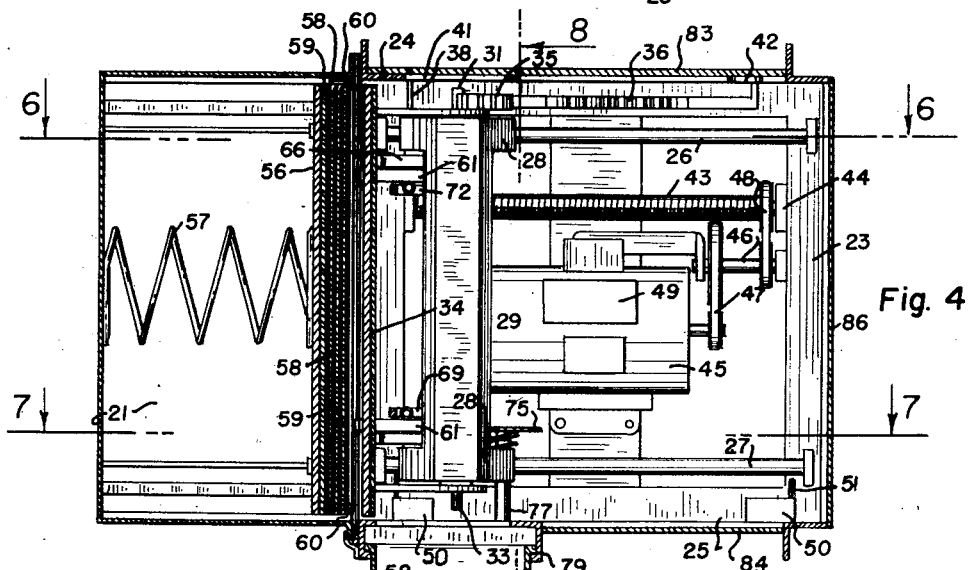
Fig. 4 is a longitudinal section through the structure of Fig. 3, taken on the line 3—3 of the latter figure.
Figure 5:
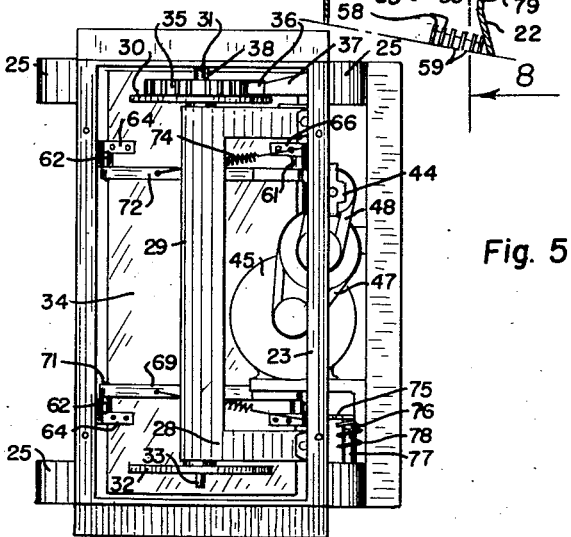
Fig. 5 is a front view of the improved film interchanger with its front enclosing plate removed and looking in the direction of the arrow 5 in Fig. 3.

The film plate 34 normally rests in the exposure position, that is, in the forward, broken line position "A" of Fig. 3. The circuit, including the various switches, is such that when the remote control switch 52 is closed it will actuate the starting relay to close the circuit to the motor 45 so as to cause the latter to rotate the threaded shaft 43 in a direction to cause the carriage member 29 to travel rearwardly until the solid line position of Fig. 3 is reached, at which time the activating pin 51 will contact the rearmost limit switch 50, causing the latter to activate the reversing relay 49 so as to cause the carriage member 29 to travel forwardly, carrying the film mechanism through the broken line position "B" to the broken line position "A." When position "A" is reached, the activating pin 51 will contact the forward limit switch 50 to reverse the reversing relay 49 and to open the circuit to the starting relay 87, allowing the motor to come to rest. Therefore, it will be seen that at each actuation of the remote control switch 52, the film plate will go through its complete cycle of motion from the front frame 23 to the rear frame 24, thence back to the front frame 23.

The unexposed film container 21 is formed with grooved forward flanges 55 for receiving a light shield, not shown, which shields the film therein until the container is in place on the interchanging device 15. These flanges are slidably received in grooved guide channels 54 formed on the rear frame 24 to removably retain the container 21 in place. The exposed film box 22 is also removably retained on the framework by means of guide slide members 79. The container 21 is provided with a press plate 56 which is constantly urged forwardly against the supply of film by means of a compression spring 57. The films, indicated at 58, are separated from each other by means of cardboard spacers 59, as described in applicant's prior Patent No. 2,349,427. As the films and their spacers are placed in the container 21, the spring 57 is gradually compressed to constantly maintain a forward pressure on the supply of films.

The foremost film is prevented from being forced from the reservoir by means of upper and lower film-retaining clips 60. As the film plate 34 approaches the foremost film, the latter is gripped by means of a left-hand pair of film gripping-hooks 61 and a right-hand pair of film-gripping hooks 62 and as the film plate 34 moves away from the container, the flexible foremost film is pulled from the clips 60 and carried with the film plate. As each film is withdrawn, the succeeding spacer 59 will be released and allowed to fall into the exposed film box 22.

The right-hand pair of film-gripping hooks 62 are hingedly mounted, as shown at 63, upon hook-supporting brackets 64 secured to the back of the film plate 34 adjacent the right edge thereof. The left-hand pair of film-gripping hooks 61 are secured upon a vertical axle rod 65 which is rotatably mounted in vertical bearing brackets 66 secured to and projecting rearwardly from adjacent the left edge of the film plate 34.

The axle rod 65 is oscillated at intervals by means of a cam follower lever 67 which is secured to and extends rearwardly from the axle rod 65 and terminates in a cam follower abutment 68. The cam follower lever 67 is positioned adjacent the lower extremity of the axle rod 65 and is connected by means of a connecting bar 69 with the opposite film-gripping hook 62. The connecting bar 69 is connected to the cam follower lever 67 by means of a hinge 70 and is connected to the opposite film-gripping hook 62 by means of a second hinge 71.

An upper connecting bar 72 extends between the upper right-hand film-gripping hook 62 and an actuating lever 72 corresponding to the cam follower lever 67. The hinges at the opposite extremities of the connecting bars 69 and 72 are on opposite sides of the axes of the hinge bar 65 and the hinges 63 so that when the film-gripping hooks at one side of the plate 34 are swung outwardly, the film-gripping hooks 62 at the other side will be simultaneously swung outwardly.

The film-gripping hooks are constantly urged to their closed or hooking positions by means of tension springs 74 acting upon the cross-bars 69 and 72. The film-gripping hooks are swung outwardly as the film plate 34 approaches its rearmost position in consequence of the cam follower abutment 68, striking a cam member 75. The cam member 75 is mounted on a rotatable upper portion 76 of a cam post 77. The upper portion 76 is constantly urged toward its engaging position (solid line position) in Fig. 10 by means of a torsion spring 78.

Let us assume that the film plate 34 is approaching the stack of films in the container 21. The cam follower abutment 68 will strike the cam member 75 and be depressed to the broken line position "C" in Fig. 10, causing the film-gripping hooks 61 and 62 to open outwardly.

At the instant the cam plate rests against the foremost film of the stack, the abutment 68 will leave the cam 75, allowing the springs 74 to snap the film hooks inwardly to grip the film against the film plate 34. The film plate will now start rearwardly, bringing the cam abutment 68 against the cam member 75 and swinging it rearwardly and outwardly, as indicated in broken line at "D," Fig. 10, so that the abutment may pass the cam member 75 without actuating the film hooks.

The film is now carried forwardly to rest in the exposure position in the front frame 23. After the exposure is completed, the remote control switch 52 is actuated to cause the film plate to travel rearwardly. As the film plate approaches its extreme rearward position, the abutment 68 travels upon the cam surface of the cam member 75, opening the film-gripping hooks 61 and 62 and allowing the exposed film to drop downwardly into the exposed film box 22 against the spacer which has previously dropped therein.

Thus, it can be seen that the improved film interchange device can be mounted on the interior of a cylindrical container or other installation which is difficult of access and will automatically and successively position a plurality of unexposed films in the exposure position and place the exposed films in a receiving container without personal attention other than actuating the remote control switch 52.

When working in a container such as shown in Fig. 1, it is possible that an internal obstruction on the container might accidentally engage the interchange device and tend to rotate the latter with the container out of the path of the X-rays. Should such an accident occur, means are provided for signaling the operator through the medium of a pendulum switch device 80 which is mounted on the side of the exposed film box 22 and connected by means of suitable conductors 81 to a signal light 82 visible to the operator. Movement of the interchange device in either direction from its normal exposure position will actuate the pendulum switch and immediately indicate to the operator that the next successive film is not in proper position for exposure.

Should the device be desired for ordinary light-exposure photographing, the front plate 86 would be replaced by a conventional camera lens board.

While a specific form of the invention has been described and illustrated herein, it is desired to be understood that the same may be varied, within the scope of the appended claims, without departing from the spirit of the invention.

Having thus described the invention, what is claimed and desired secured by Letters Patent is:

1. An automatic photographic film changing device comprising: a front frame; a rear frame; side frame members maintaining said two frames in parallel, spaced-apart relation to form an open box-like framework; a housing supported by and enclosing said framework; a pair of vertically spaced horizontally extending guide members extending between and supported from said front and rear frames; a cross-head member slidably mounted on each guide member; a vertical carriage member connecting said two cross-head members; a film-holding plate pivotally mounted on a vertical axis on said carriage member; means for actuating said cross-head members forwardly and rearwardly along said guide members; means for swinging said film-holding plate forwardly and rearwardly of said carriage member in consequence of the forward and rearward movements of said cross-head members; and means on said film-holding plate for attaching a film thereto when said plate reaches its extreme rearmost position and for releasing a film therefrom when said plate approaches its rearmost position.

2. An automatic film changing device as described in claim 1 in which the means for actuating said cross-head members comprises: a rotatable threaded shaft journalled in and extending between said front and rear frames; a nut member threaded on said shaft; connecting means connecting said nut to one of said cross-head members to transmit longitudinal movement of the former to the latter; and means for rotating said threaded shaft.

3. An automatic film changing device as described in claim 2 in which the means for transmitting movement to said threaded shaft comprises: a drive motor; power transmission means transmitting rotation from said motor to said shaft; and means for controlling the direction of rotation of said motor in consequence of the approach of said film plate to its extreme forward and rearward positions.

4. An automatic film changing device as described in claim 3 in which the motor comprises an electric motor and in which the means for controlling the direction of rotation of said motor comprises: electric limit switches mounted on said framework in the path of said carriage member; a reversing switch; and an electric motor circuit including said limit switches said reversing switch and said motor, so that when a limit switch is actuated by said carriage member it will actuate said reversing switch to reverse the circuit to said motor.

5. An automatic film changing device as described in claim 4 having a starting switch in said motor circuit for initially energizing the latter; and a remote control switch connected in circuit with said starting switch for electrically actuating the latter.

6. An automatic film changing device as described in claim 1 in which the means for attaching a film to and releasing a film from said film plate comprises: a film gripping hook pivoted on and rearwardly of said film plate at each side thereof and extending partially over the front thereof to grip a film against the forward face of said plate; interconnecting means between said film gripping hooks acting to cause them to swing oppositely and simultaneously; means for swinging said hooks in consequence of the approach of said film plate to its rearmost position; and spring means urging said hooks to the film gripping position.

7. An automatic film changing device as described in claim 6 in which the means for swinging said hooks comprises: a cam follower lever secured to and projecting from one of said hooks; a cam member mounted on said framework adjacent the rear of the latter and in the path of said cam follower lever and adapted to be contacted by said cam follower lever as said film plate approaches its rearmost position.

8. An automatic film changing device as described in claim 7 in which said cam member is rotatably mounted on said framework so that when said film plate moves rearwardly the cam member will rotate without actuation of said cam follower lever.

References Cited in the file of this patent

UNITED STATES PATENTS

| | | |
|---|---|---|
| 552,570 | Younger | Jan. 7, 1896 |
| 1,558,272 | Pedersen | Oct. 20, 1925 |
| 2,349,427 | Heimerich | May 22, 1944 |
| 2,622,206 | Passannate | Dec. 16, 1952 |
| 2,709,221 | Haupt et al. | May 24, 1955 |